(12) United States Patent
Stuart et al.

(10) Patent No.: US 9,800,732 B2
(45) Date of Patent: *Oct. 24, 2017

(54) METHOD AND SYSTEM TO CONTACT A PROVIDER

(75) Inventors: Erik Anderson Stuart, San Mateo, CA (US); Valerie K. Shirk, San Jose, CA (US); Jason Scott Steinhorn, Cupertino, CA (US)

(73) Assignee: eBay Inc., San Jose, CA (US)

( * ) Notice: Subject to any disclaimer, the term of this patent is extended or adjusted under 35 U.S.C. 154(b) by 1506 days.

This patent is subject to a terminal disclaimer.

(21) Appl. No.: 11/638,035

(22) Filed: Dec. 13, 2006

(65) Prior Publication Data

US 2008/0144607 A1 Jun. 19, 2008

(51) Int. Cl.
*H04M 7/00* (2006.01)
*G06Q 10/10* (2012.01)
*G06Q 30/00* (2012.01)

(52) U.S. Cl.
CPC ............ *H04M 7/003* (2013.01); *G06Q 10/10* (2013.01); *G06Q 30/00* (2013.01)

(58) Field of Classification Search
CPC .... G06Q 30/0601; G06Q 10/10; G06Q 30/00; H04L 65/1046; H04L 12/1482; H04M 7/003
USPC ................................... 705/35; 370/351, 352
See application file for complete search history.

(56) References Cited

U.S. PATENT DOCUMENTS

| | | | |
|---|---|---|---|
| 5,999,525 A * | 12/1999 | Krishnaswamy et al. ..... 370/352 |
| 8,266,533 B2 * | 9/2012 | Zacarias ............... G06Q 30/02 |
| | | | 715/748 |
| 2002/0069079 A1 * | 6/2002 | Vega ................................. 705/1 |
| 2004/0006478 A1 * | 1/2004 | Alpdemir et al. ............. 704/275 |
| 2004/0032393 A1 * | 2/2004 | Brandenberg et al. ........ 345/156 |
| 2006/0265259 A1 * | 11/2006 | Diana et al. ...................... 705/7 |
| 2006/0277108 A1 * | 12/2006 | Altberg et al. ................ 705/14 |
| 2007/0043651 A1 * | 2/2007 | Xiao et al. ...................... 705/37 |
| 2007/0100956 A1 * | 5/2007 | Kumar .......................... 709/217 |
| 2007/0208630 A1 * | 9/2007 | Chatter et al. .................. 705/26 |
| 2007/0271110 A1 * | 11/2007 | Van Der Linden et al. ..... 705/1 |

OTHER PUBLICATIONS

"Decision Trees", [Online]. Retrieved from the Internet: <URL: http://www.csc.kth.se/utbildning/kth/kurser/DD2431/ml11/schedule/03-trees-2×2.pdf>, (Accessed Jul. 25, 2012), 6 pgs.

* cited by examiner

*Primary Examiner* — Behrang Badii
*Assistant Examiner* — Daniel L Greene
(74) *Attorney, Agent, or Firm* — Schwegman Lundberg & Woessner, P.A.

(57) ABSTRACT

A method and system to contact a provider are described. The system may include a communication module to receive a referral request, a referral generator, and a call module. The referral generator may be configured to respond to the referral request by selecting a provider from a network of providers. The call module may be configured to initiate a voice over Internet protocol (VoIP) call in order to contact the selected provider.

19 Claims, 10 Drawing Sheets

METHOD AND SYSTEM TO CONTACT A PROVIDER

TECHNICAL FIELD

This application relates to electronic commerce in general and a method and system to contact a provider in particular.

BACKGROUND

Electronic commerce marketplace may provide a powerful online platform for the sale of goods and services by a community of individuals and small businesses. On any given day, there may be a great number of items available through auction-style and fixed-price trading. A buyer may select an item via an associated user interface, indicate to a seller a desire to buy the item, and finalize the purchase. In some existing systems, a vendor who utilizes an online platform that facilitates electronic commerce marketplace may be charged a percentage of the final sale price.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

A method and system to contact a provider are described. In one example embodiment, the system to contact a provider is implemented in the context of an on-line referral service. An on-line referral service may be configured to respond to a referral request from a user by automatically selecting a suitable provider and automatically routing a voice over Internet protocol (VoIP) call to the selected provider. A suitable provider may be selected from one of several providers within a network of member providers. A VoIP call to the selected provider, in one example embodiment, may be treated as an indication of potential business opportunity (a lead) for the provider. The provider may then be charged a predetermined fee for each lead generated by the example referral service.

An example system to contact a provider may include a graphical user interface (GUI) to present a user with a selection of services or goods and to permit a user to request a referral of a provider of the selected service or goods. An example GUI may include a visual control, e.g., a "Call Now" button, that a user may activate to indicate a desire to contact a provider of a particular service or of particular goods. In one example embodiment, a user may select a service, specify criteria for a provider, and click on the "Call Now" button. In response, an example system may automatically determine a suitable provider utilizing the submitted criteria, and initiate a VoIP call to the determined provider.

An example system to contact a provider may be configured to determine fees to be charged to a provider based on the number of leads associated with VoIP calls to providers. In one example embodiment, a call to a particular provider may be identified selectively as a lead if the call duration is longer than a predetermined period of time, e.g., if the call duration is longer than 20 seconds. A user who is the originator of the referral request that triggered the VoIP call may be requested to submit feedback regarding the determined provider.

In one example embodiment, a system to contact a provider may include a software tool (termed, e.g., a leads manager) to permit providers to manage the leads obtained through VoIP calls initiated by the system. The leads manager may be used to keep track of the leads, to sort and to categorize the leads, to associate various information with the leads, etc.

It will be noted, that while some example embodiments are being described with reference to service providers, it will be understood that the techniques described herein may be advantageously utilized to generate leads for providers of goods. An example of a network environment including an on-line referral service is illustrated in FIG. 1.

Figure 1:
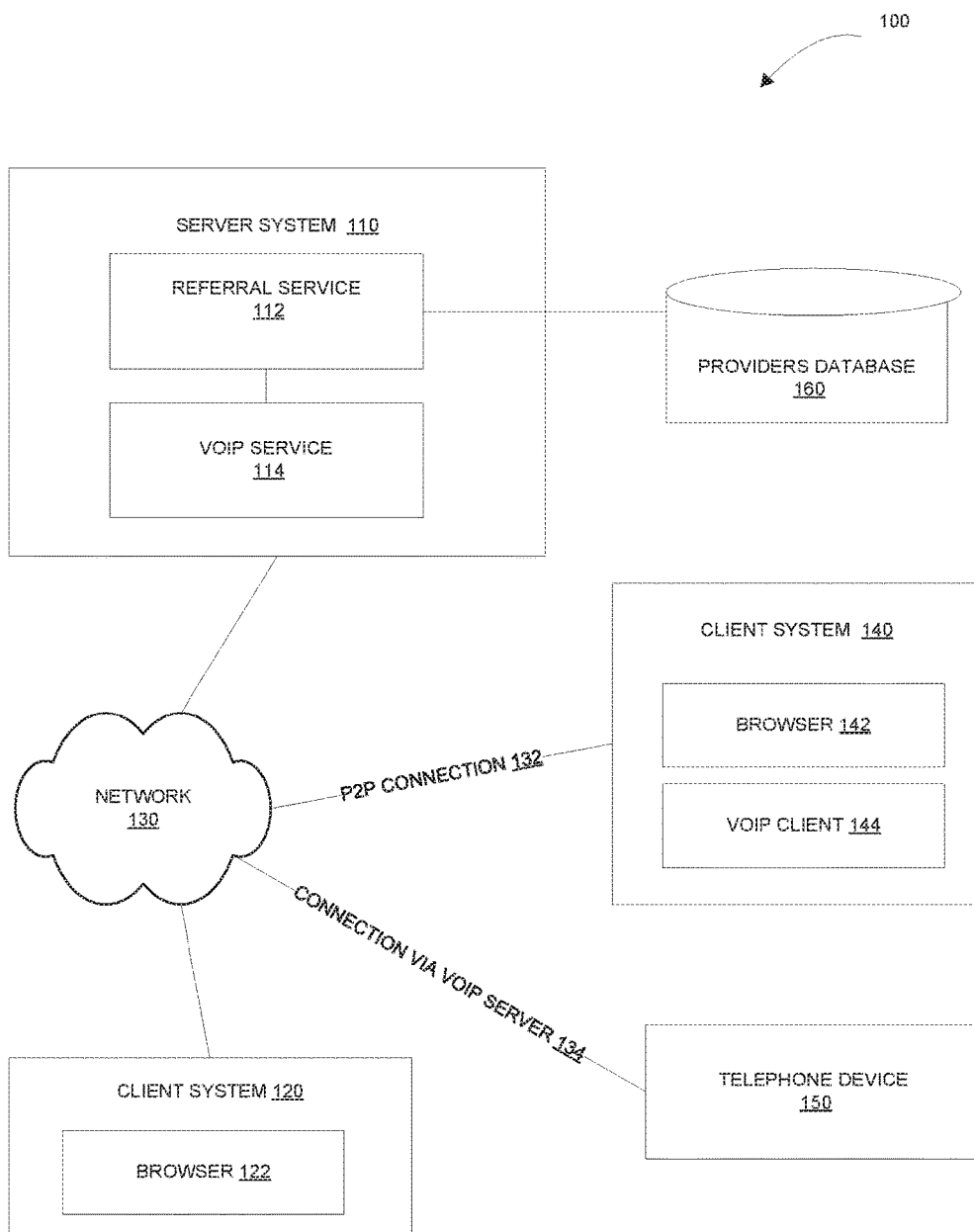
FIG. 1 is a diagrammatic representation of a network environment within which an example embodiment may be implemented.

FIG. 1 illustrates a network environment 100. The environment 100, in an example embodiment, includes a server system (server) 110 and client systems (clients) 120 and 140, coupled to a communications network 130. The communications network 130 may be a public network (e.g., the Internet, a wireless network, etc.) or a private network (e.g., LAN, WAN, Intranet, etc.). In the environment 100, the clients 120 and 140 may have access to an on-line referral service 112 running on the server 110, via browser applications 122 and 142 respectively.

The on-line referral service 112 may cooperate with a VoIP service 114 to initiate calls to selected providers. In one example embodiment, the on-line referral service 112 and the VoIP service 114 may be configured as a single service, e.g., the functionality of the on-line referral service 112 may be packaged together with an application running the VoIP service 114.

The example on-line referral service 112 may be used to maintain a network of providers. Various information associated with providers that are members of the network of providers associated with the referral service 112 may be stored in a providers database 160. In one example embodiment, the network of providers may be organized utilizing demographic information of the member providers. The providers database 160 may be local with respect to the server system 110 or, in one example embodiment, may be accessible via the network 130.

Where a provider selected by on-line referral service 112 has access to VoIP software, e.g., to a VoIP client 144, a call to the selected provider may be initiated via a peer to peer (P2P) connection between the VoIP service 114 at the server system 110 and the VoIP client 144 of the client system 140. If the selected provider does not have access to a VoIP service, but has access to a conventional telephone device 150, the VoIP service 114 may initiate a call to the telephone device 150, via a connection 134 that may utilize a VoIP server. The telephone device 150 may be associated with the basic service supplying standard single line telephones, telephone lines, and access to the public switched network. An example system implementing the referral service 112 is discussed with reference to FIG. 2.

Figure 2:
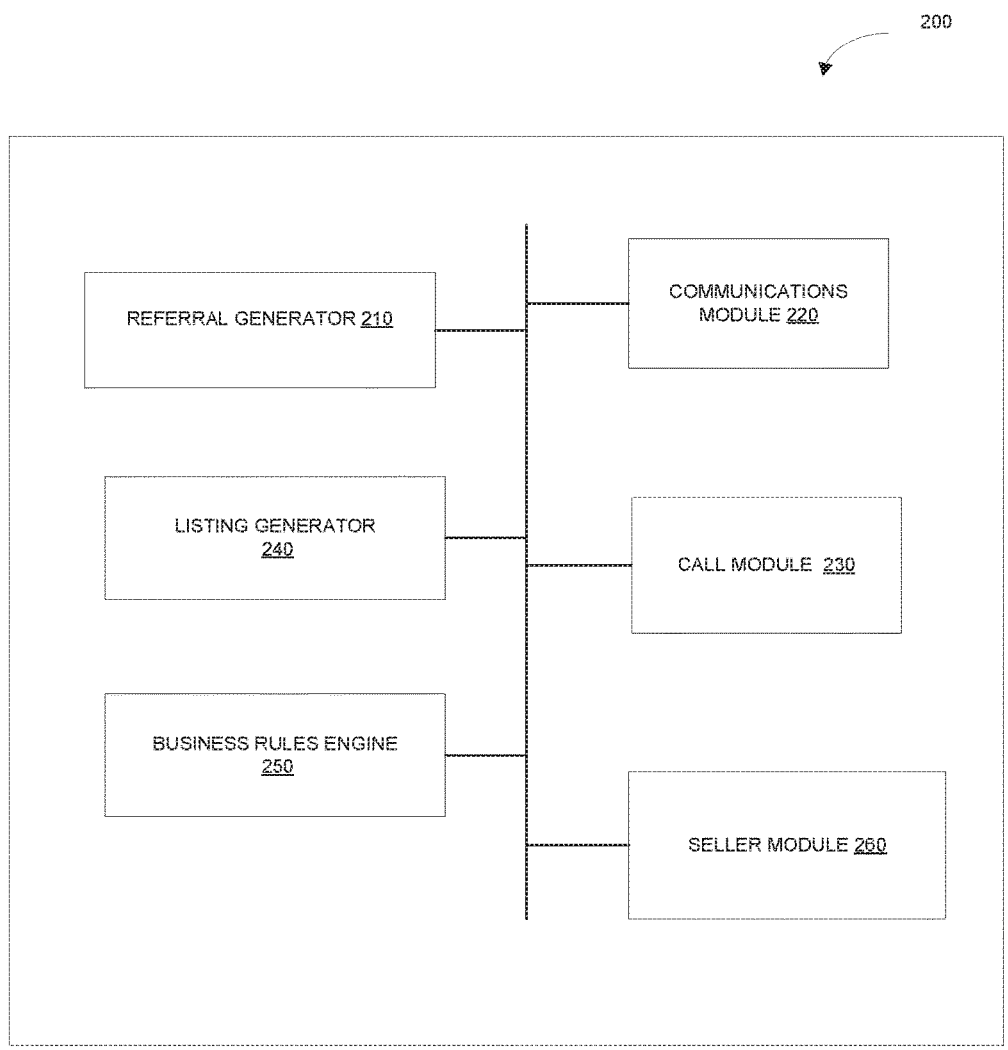
FIG. 2 a block diagram of a system to contact a provider, in accordance with an example embodiment.

FIG. 2 is a block diagram of a system 200 to contact a provider of goods, services, or both, in accordance with an example embodiment. As shown in FIG. 2, the system 200 includes a referral generator 210, a communications module 220, a call module 230, a listing generator 240, a business rules engine 250, and a seller module 260.

The communications module 220 may be configured to receive requests from users, e.g. requests from potential buyers to select a provider of a particular service and to make contact with the selected provider. The referral generator 210 may be configured to process requests received by the communications module 220. For example, the referral generator 210 may obtain selection criteria from the referral request, interrogate the providers database 160 of FIG. 1 with the selection criteria, and generate a referral, based on the results of the interrogation. The call module 230 may be configured to contact the selected provider by initiating a VoIP call to the selected provider. In one example embodiment, the referral generator 210 may be configured to cooperate with the business rules engine 250 to select a provider.

An example scenario illustrating the use of the referral service 112 implemented as the system 200 may be described as follows. A user, who may be termed a potential buyer of goods or services that are being offered through a web service, may access a web site hosting the referral service 112. The user may indicate, via an associated user interface (UI), that she is looking for a certain kind of service, such as plumbing. The user may browse the web site, type in a search term and request a search, or perform some other operations to view a number of listings for plumbing services. In one example embodiment, a single listing may be associated with several providers of plumbing services that are grouped based on a certain characteristic, such as geographic location of each provider in the group. In another example embodiment, plumbing services may be grouped functionally, e.g., by a specific type of a plumbing service. A user may select a particular listing, e.g., by clicking on an example "Call me" control button associated with the listing.

When the user activates the "Call me" control button associated with the listing, the business rules engine 250 selects a provider from the associated group of providers based on predetermined business rules. The predetermined business rules may utilize, for example, demographic information of a provider and of the user, a price range for plumbing services, geographic location of a provider and of the user, the reputation of a provider, etc. Other criteria that may be utilized by the business rules engine 250 may include the languages spoken by a provider and by the user.

When the referral generator 210 selects an appropriate provider, based on the business rules, the call module 230 may be generated to channel a VoIP call to the selected provider. In one example embodiment, when the selected provider answers the call, that service provider may be charged a predetermined fee for having received a lead. The system 200 may include a seller module 260 that may be configured to evaluate each call to a provider generated by the call module 230 in order to determine whether a particular call may qualify as a lead.

It will be noted that, in some example embodiments, the functions performed by two separate modules of the system 200 may be performed by a single module. For example, the operations performed by the referral generator 210 and the business rules engine 250 may be performed by a single referral module. In another example embodiment, the operations performed by the business rules engine 250 may be performed by several functional modules, e.g., by a demographic selector, a price selector, a reputation selector, etc.

As mentioned above, the referral service 112, which, in an example embodiment, may be implemented as the system 200, may be utilized to permit a potential buyer to contact a provider of goods or services. An example method to contact a provider is described with reference to FIG. 3.

Figure 3:
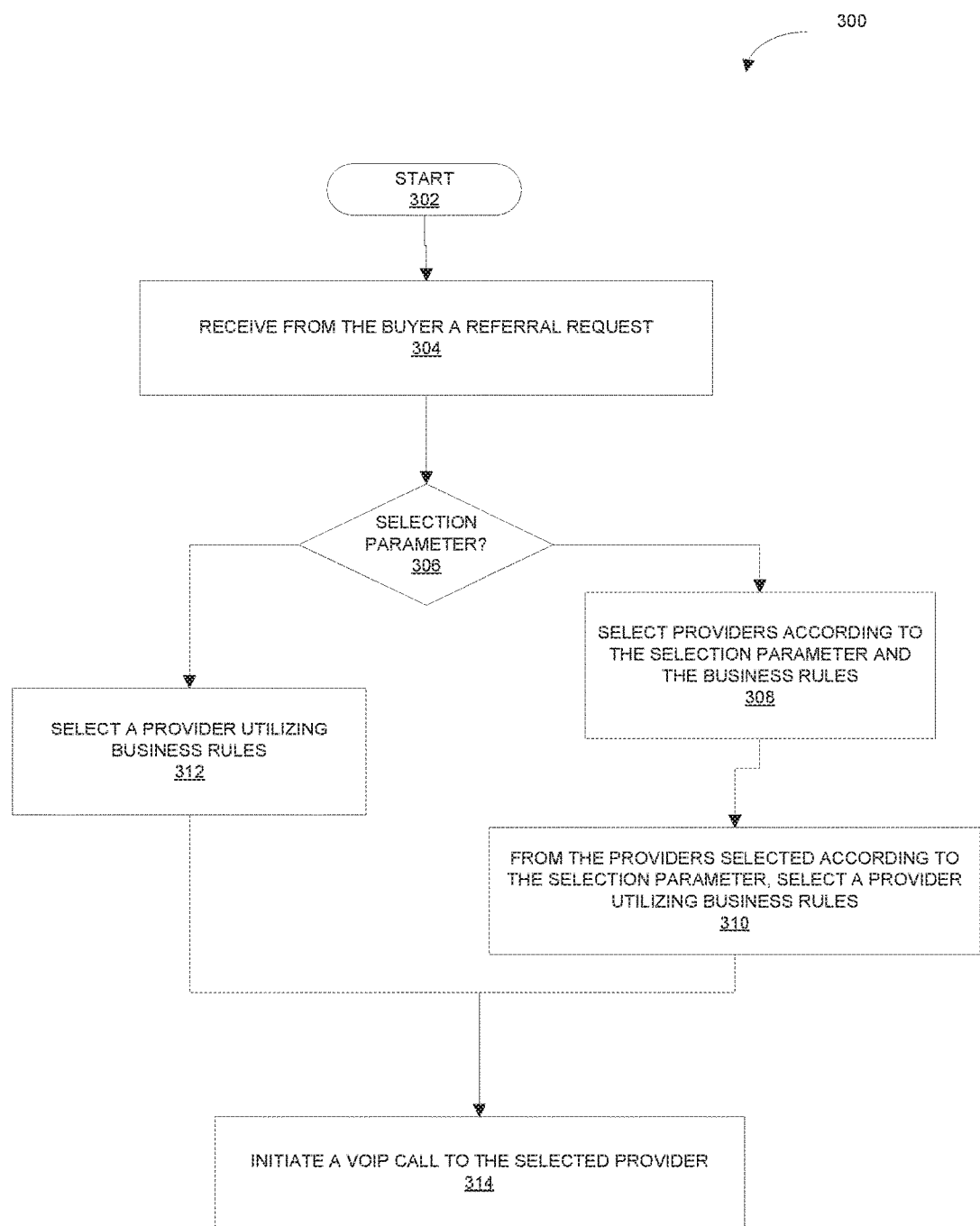
FIG. 3 is a flow chart of a method to contact a provider, in accordance with an example embodiment.

FIG. 3 is a flow chart of a method 300 to contact a provider, according to an example embodiment. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at a server system 110 of FIG. 1. In another example embodiment, the processing logic may reside at the client 120, at a server 110 or may be distributed between the client 120 and the server 110 of FIG. 1. In one example embodiment, the method 300 may be performed by the various modules discussed above with reference to FIG. 2. Each of these modules may comprise processing logic.

As shown in FIG. 3, the method 300 commences at operation 302. At operation 304, the communications module 220 receives, from a user (e.g., a potential buyer), a referral request with respect to a provider of goods or services. The referral request may include a request to contact or otherwise access the referred provider.

At operation 306, the referral generator 210 determines whether the referral request includes any selection parameters, such as the preferred location of a provider, the price range for the services, the reputation of the provider, etc. If it is determined, at operation 306, that the referral request includes one or more selection parameters, the referral generator 210 utilizes these selection parameters to select, at operation 308, one or more providers from a network of member providers that satisfy criteria associated with the selection parameter. A selection parameter may be associated, in one example embodiment, with demographic information of a provider. In some example embodiments, a selection parameter may be associated with demographic information of a potential buyer.

At operation 310, the business rules engine 250 may be employed by the referral generator 210 to select a single provider (e.g., a provider who is considered by the system to be the most suitable to satisfy the referral request) from the one or more providers chosen based on the selection parameter.

If it is determined, at operation 306, that the referral request does not include any selection parameters, the referral generator 210 cooperates with the business rules engine 250 to select, at operation 312, a suitable provider from a network of member providers, utilizing the business rules that are provided with the business rules engine 250.

At operation 314, the call module 230 initiates a VoIP call to the selected provider. Depending on the outcome of the call and, in some example embodiments, depending on the duration of the call, the call may be identified as a lead with respect to the selected provider and be included into a calculation of any per-lead fees charged to the selected provider. The identifying of a VoIP call to the selected provider as a lead may be performed by the seller module 260. Example seller module may be described with reference to FIG. 4.

Figure 4:
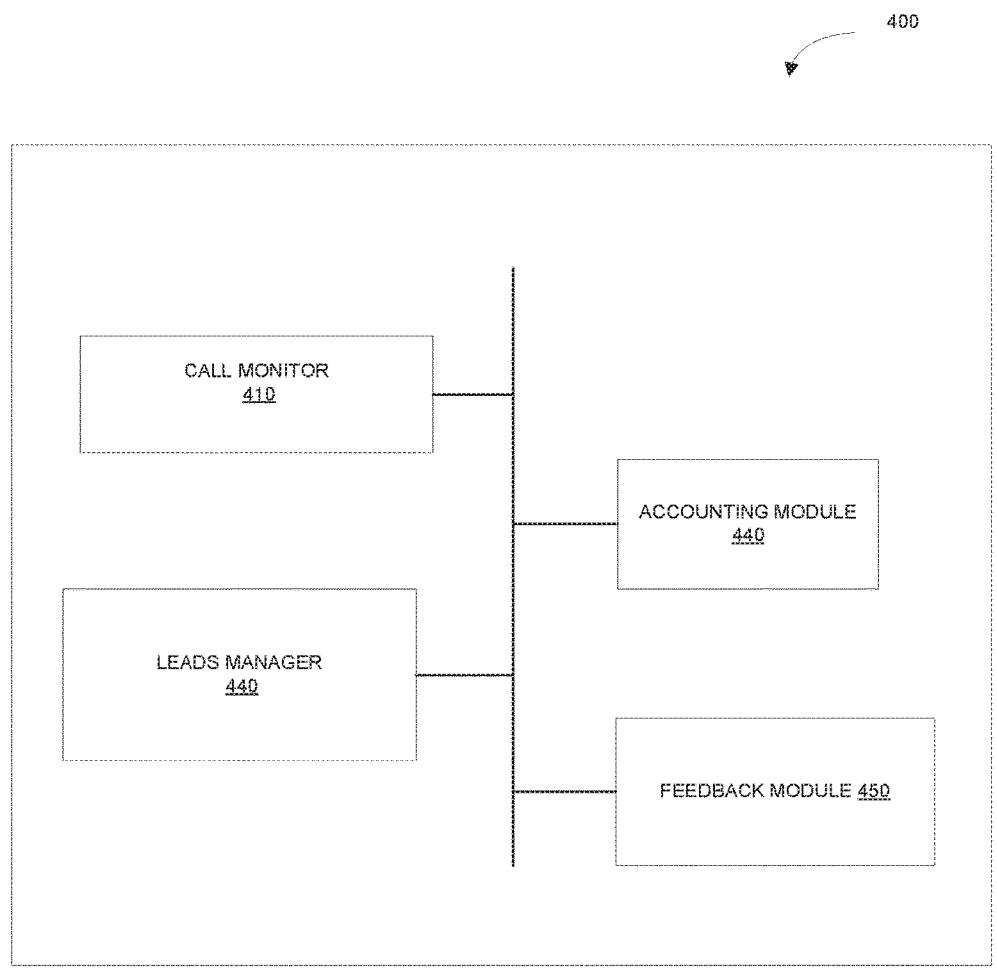
FIG. 4 a block diagram of a seller module, in accordance with an example embodiment.

FIG. 4 is a diagrammatic representation of a seller module 400, in accordance with an example embodiment. As shown in FIG. 400, the example seller module 400 may include a calls monitor 410, an accounting module 420, a leads manager 430, and a feedback module 450.

The calls monitor 410 may be configured to track the length of a VoIP call to the provider and to utilize this information to determine whether the call qualifies as a lead. The accounting module 420 may be configured to calculate the fees to be charged to a provider, based on the number of leads generated by the referral service 112 for the provider. The leads manager 430 is configured, in one example embodiment, to permit a provider to organize, categorize, and otherwise manage the leads.

In one example embodiment, when a VoIP call to the selected provider is identified as a lead, the seller module 400 engages the feedback module 450 to obtain feedback from the originator of the associated referral request regarding the selected provider. An example method to process a VoIP call is described with reference to FIG. 5.

Figure 5:
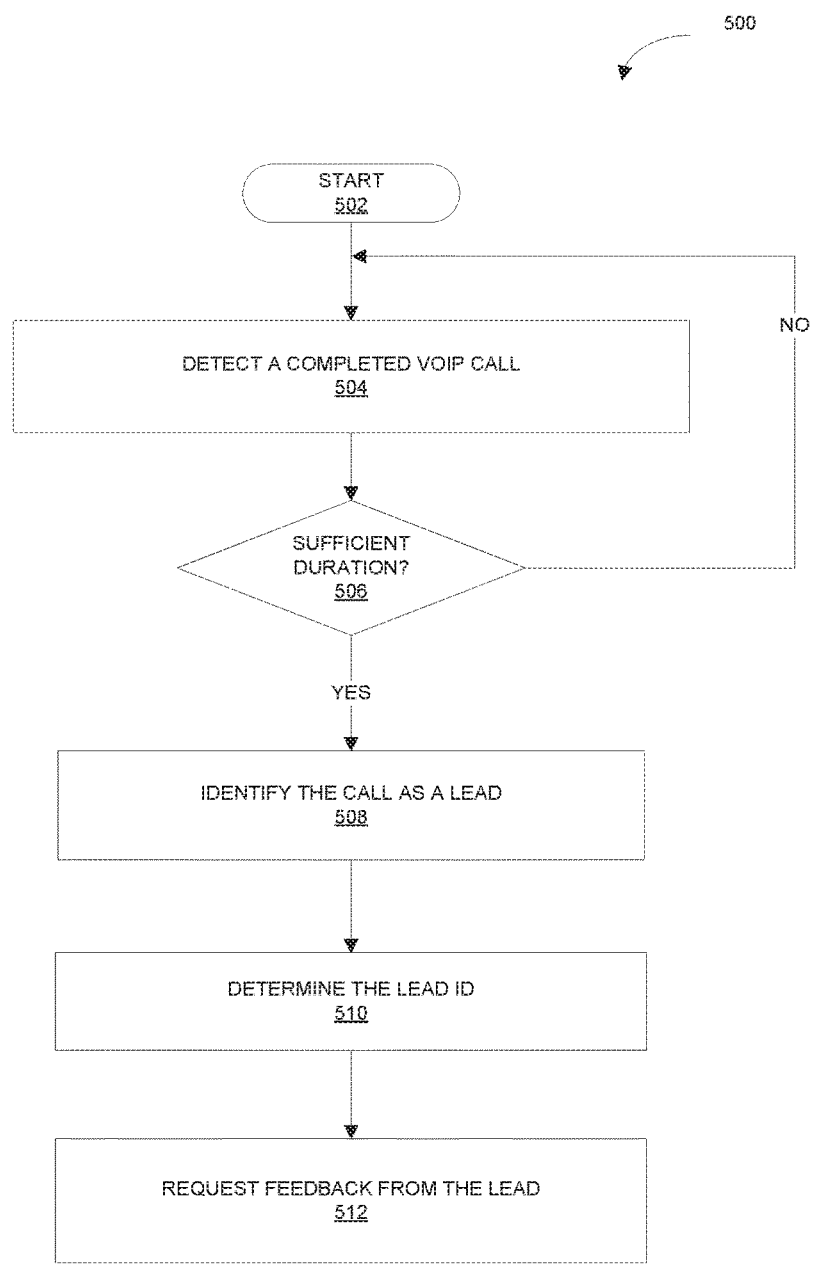
FIG. 5 is a flow chart of a method to process a VoIP call, in accordance with an example embodiment.

FIG. 5 is a flow chart of a method 500 to process a VoIP call, according to an example embodiment. The method 500 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at a server system 110 of FIG. 1. In another example embodiment, the processing logic may reside at the client 120, at a server 110 or may be distributed between the client 120 and the server 110 of FIG. 1. In one example embodiment, the method 500 may be performed by the various modules discussed above with reference to FIG. 4. Each of these modules may comprise processing logic.

As shown in FIG. 5, the method 500 commences at operation 502. At operation 504, the calls monitor 410 detects a completed VoIP call to a provider. The calls monitor 410 then determines the duration of the completed VoIP call. If it is determined, at operation 506, that the call duration is less than a predetermined threshold, the call is not considered as a lead with respect to the provider, and the method 500 returns to operation 504. Consequently, in one example embodiment, a call that is shorter than a predetermined duration does not affect the fee charged to the provider by the referral service 112 of FIG. 1.

If it is determined, at operation 506, that the call duration is equal to or greater than a predetermined threshold, the call is identified as a lead with respect to the provider. The accounting module 440 may then update the amount to be charged to the provider for the generated leads.

At operation 510, the feedback module 450 may be engaged to determine an identification of the lead associated with the completed VoIP call and request feedback from the lead, at operation 512. The feedback received from the lead may be utilized at a later time in executing business rules to select a provider in response to a referral request from a user.

It will be noted, that while the method 500 uses the duration of a VoIP call to determine whether a particular contact qualifies as a lead, various additional or other criteria may be utilized to define a lead. For example, other factors may include whether the call goes to voice mail, whether the same buyer has contacted that seller within the last predetermined number of days, etc.

Figure 6:
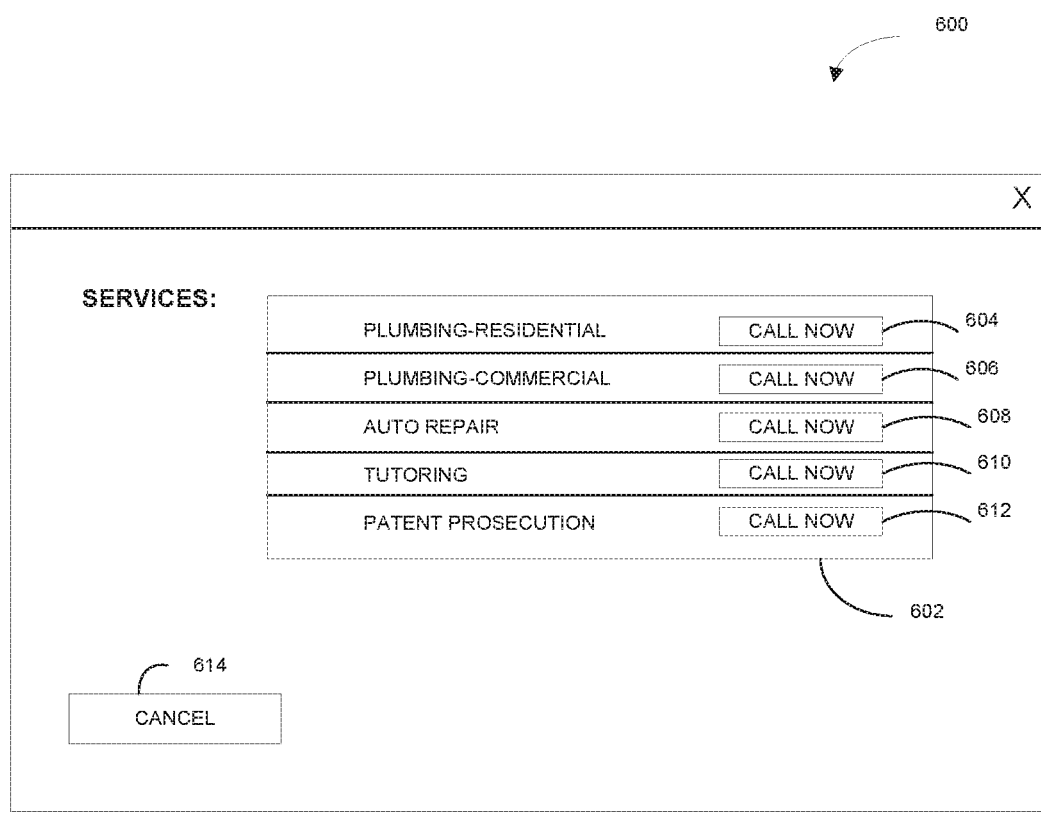
FIG. 6 is a diagrammatic representation of an example user interface to permit a user to request a referral, in accordance with an example embodiment.

FIG. 6 is a diagrammatic representation of an example user interface 600, that may be associated with the referral service 112, to permit a user to request a referral. The user interface 600, in accordance with an example embodiment, comprises a services area 602. The services area 602 may include a list of different services or different types of a particular service (e.g., "PLUMBERS—RESIDENTIAL" and "PLUMBERS—COMMERCIAL"). Each service from the list of services may be displayed with an associated "CALL ME" control button, such as control buttons 604 through 612. In one example embodiment, when a user wishes to contact a provider, e.g., a tutor, the user may simply click on the "CALL ME" button 610 associated with tutoring services. In response, the referral service 112 may select a provider, e.g., utilizing business rules, and initiate a VoIP call to the selected provider. If the selected provider answers the call, the user may proceed with communicating with the selected provider.

In one example embodiment, the user interface 600 may include a "CANCEL" control 614 that can be used to exit the user interface 600 and terminate any selection or calling process. It will be noted, that the user interface 600, in one example embodiment, may include a goods area (not shown) to permit a user to request a suggested retailer information.

Figure 7:
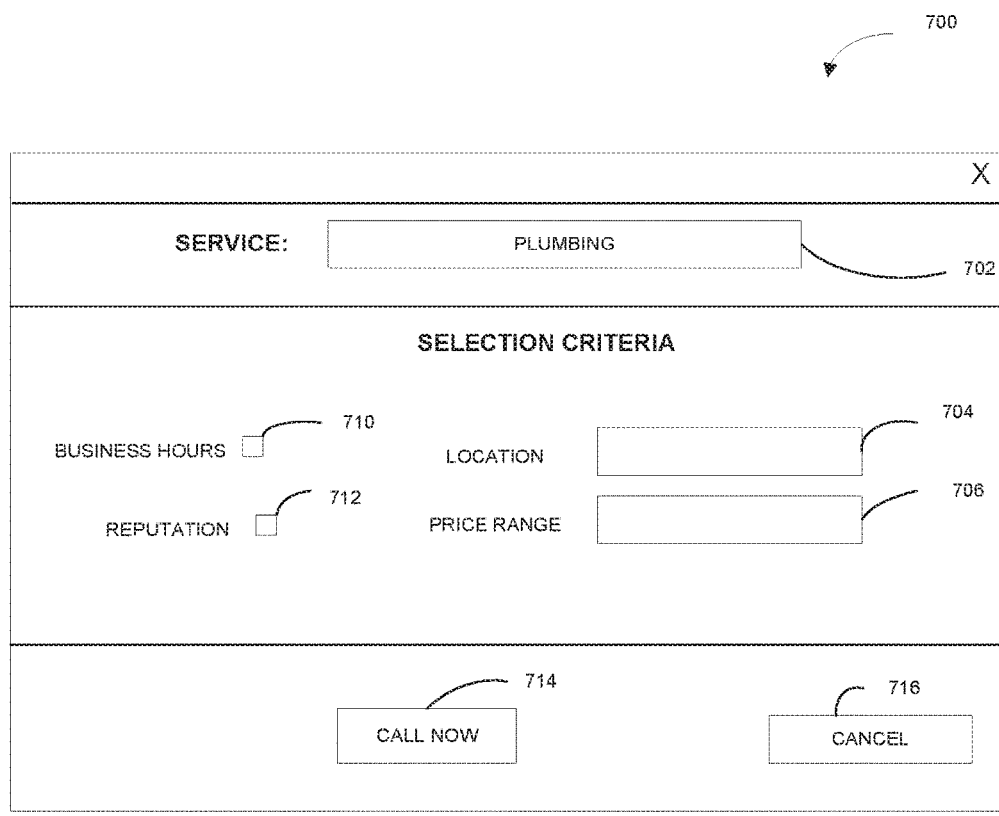
FIG. 7 is a diagrammatic representation of an example user interface to permit a user to specify selection criteria with a referral request, in accordance with an example embodiment.

FIG. 7 is a diagrammatic representation of an example user interface 700, that may be associated with the referral service 112, to permit a user to specify selection criteria with a referral request. The user interface 700, in accordance with an example embodiment, comprises a service selection field 702. The service selection field 702 may be implemented, for example, as a drop down list. The user interface 700 may further include various controls and input areas to permit a user to specify criteria for selecting a particular provider, such as "LOCATION" input box 704, "PRICE RANGE" input box 706, "BUSINESS HOURS" control 708, and "REPUTATION" control 708.

In one example embodiment, the user interface 700 may include a "CALL ME" control button 714 to permit a user to request that a provider that satisfies the selected criteria is contacted. The user interface 700 may also include a "CANCEL" control 716 that can be used to exit the user interface 700 and terminate any selection or calling process.

Figure 8:
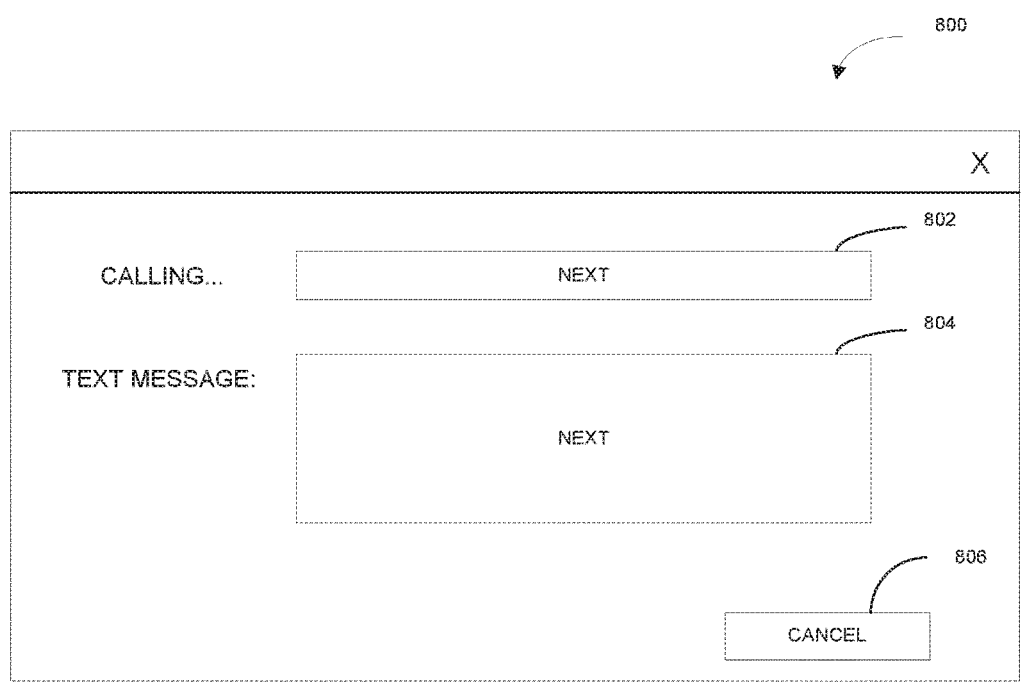
FIG. 8 is a diagrammatic representation of an example user interface to information related to a VoIP call, in accordance with an example embodiment.

FIG. 8 is a diagrammatic representation of an example user interface 800, that may be associated with the referral service 112, to display to a an originator of the referral request information related to a VoIP call. The user interface 800, in accordance with an example embodiment, includes a "CALLING . . . " indicator 802 to inform a user that a call is being made, and a "TEXT MESSAGE" area 804 to permit a user to send an optional text message to the selected provider. The user interface 800 may also include a "CANCEL" control 806 that can be used to exit the user interface 800 and to terminate the calling process.

Figure 9:
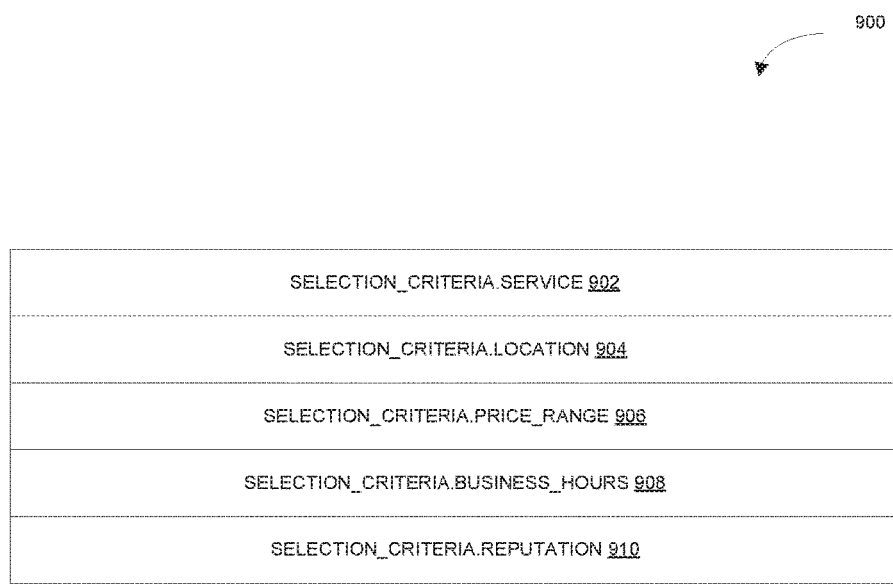
FIG. 9 is a diagrammatic representation of an example data structure to represent selection criteria information, in accordance with an example embodiment.

FIG. 9 is a diagrammatic representation of an example data structure 900 to represent selection criteria information, in accordance with an example embodiment. As shown in FIG. 9, the example data structure 900 comprises fields 902 through 910. "SELECTION_CRITERIA.SERVICE" field 902 is used to represent the service selected by a user. "SELECTION_CRITERIA.LOCATION" field 904 is used to represent geographic location selected by a user. "SELECTION_CRITERIA.PRICE_RANGE" field 906 is used to represent the price range selected by a user. "SELECTION_CRITERIA.BUSINESS_HOURS" field 908 is used to represent the business hours of a service provider selected by a user. "SELECTION_CRITERIA.REPUTATION" field 910 is used to represent the reputation criteria selected by a user.

It will be noted, that selection criteria information, as well as other information utilized by the system 200 of FIG. 2, may be represented utilizing a variety of techniques that may be available to a person skilled in the art.

Figure 10:
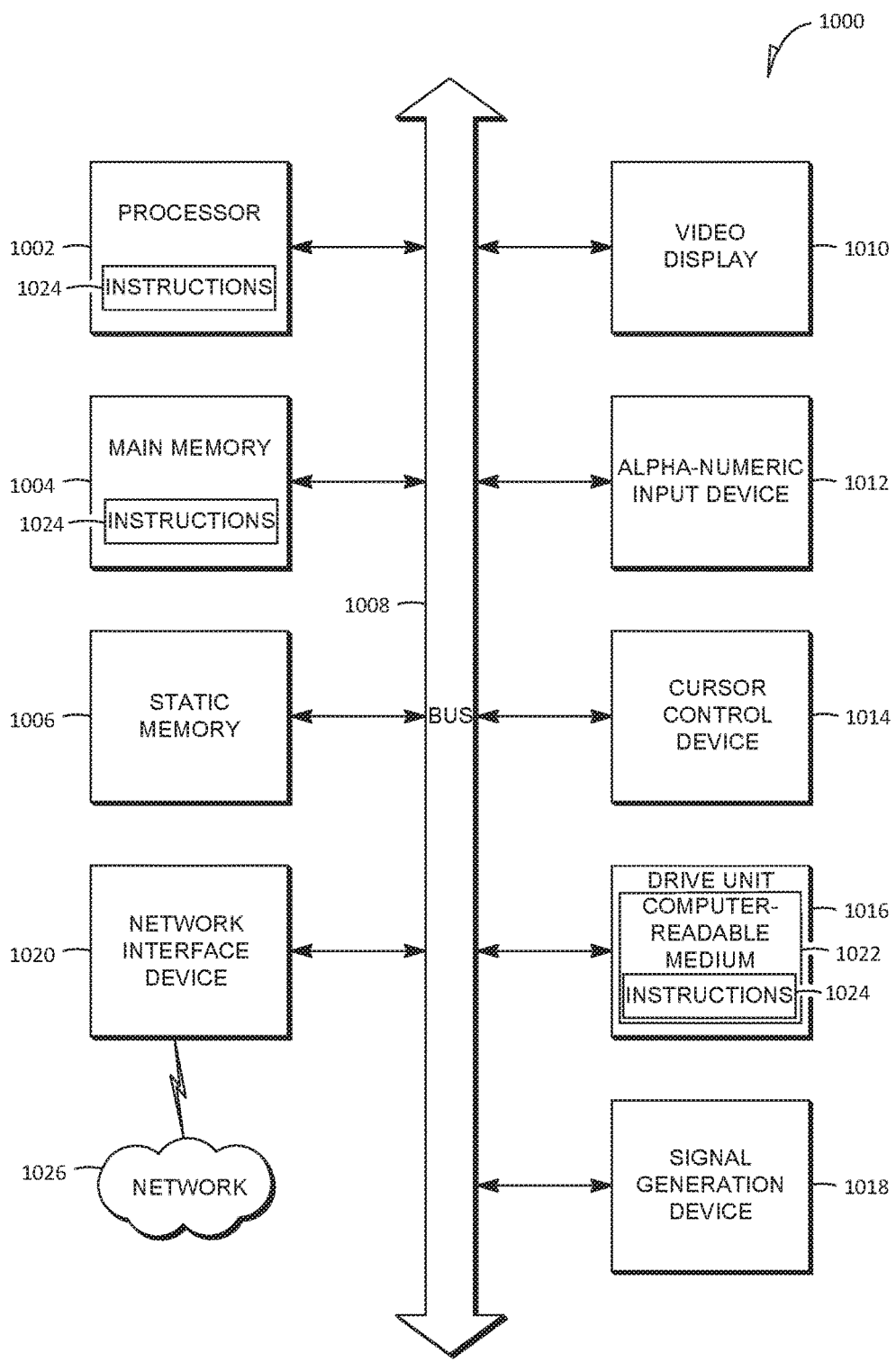
FIG. 10 is a diagrammatic representation of an example machine in the form of a computer system within which a set of instructions, for causing the machine to perform any one or more of the methodologies discussed herein, may be executed.

FIG. 10 shows a diagrammatic representation of a machine in the example form of a computer system 1000 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alpha-numeric input device 1012 (e.g., a keyboard), a user interface (UI) navigation device 1014 (e.g., a cursor control device), a disk drive unit 1016, a signal generation device 1018 (e.g., a speaker) and a network interface device 1020.

The disk drive unit 1016 includes a machine-readable medium 1022 on which is stored one or more sets of instructions and data structures (e.g., software 1024) embodying or utilized by any one or more of the methodologies or functions described herein. The software 1024 may also reside, completely or at least partially, within the main memory 1004 and/or within the processor 1002 during execution thereof by the computer system 1000, the main memory 1004 and the processor 1002 also constituting machine-readable media.

The software 1024 may further be transmitted or received over a network 1026 via the network interface device 1020 utilizing any one of a number of well-known transfer protocols (e.g., Hyper Text Transfer Protocol (HTTP)).

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of embodiments of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware.

Thus, a method and system to contact a provider have been described. Although embodiments have been described with reference to specific example systems and embodiments, it will be evident that various modifications and changes may be made to these embodiments without departing from the broader spirit and scope of the inventive subject matter. Accordingly, the specification and drawings are to be regarded in an illustrative rather than a restrictive sense.

The invention claimed is:

1. A system comprising:
at least one processor coupled to a memory;
a Graphical User Interface (GUI), the GUI comprising:
a call visual control associated with a particular service, the particular service associated with a plurality of providers in an on-line referral service, information about the plurality of providers being maintained by the on-line referral service, and
one or more selection visual controls associated with the particular service to permit a user to submit selection criteria with respect to a provider of the particular service, the call visual control and the one or more visual controls provided on the same screen of the GUI;
a communication module implemented using the at least one processor to:
detect activation of the one or more selection visual controls,
in response to the detecting of the activation of the one or more selection visual controls determine the selection criteria with respect to a provider of the particular service,
in response to the detection of the activation of the one or more selection visual controls, automatically controlling communication of a referral request to the on-line referral service;
a referral generator, implemented using the at least one processor, to receive the referral request, to determine that the referral request includes the selection criteria with respect to a provider of the particular service, and to automatically select, from the plurality of providers, a provider of the particular service, in response to the referral request and based on the selection criteria; and
a call module, implemented using at least one processor, to automatically initiate a communication with the selected provider subsequent to the receiving of the referral request and subsequently to the selecting of the provider based on the selection criteria.

2. The system of claim 1, wherein the referral generator is to select the provider of the particular service utilizing business rules.

3. The system of claim 1, wherein the selection criteria is associated with demographic information of a provider.

4. The system of claim 1, wherein data associated with the plurality of providers is organized utilizing demo graphic information of the plurality of providers.

5. The system of claim 1, wherein the communication is a voice over Internet protocol (VoIP) call.

6. The system of claim 1, wherein the activation of the call visual control is indicative of a referral request, the leads manager to store information associated with an originator of the referral request.

7. The system of claim 6, wherein the leads manager is to make the information associated with the originator of the referral request available to the selected provider.

8. The system of claim 1, comprising a leads manager to determine, using the at least one processor, metrics associated with the initiated communication.

9. The system of claim 8, wherein the leads manager is to:
monitor duration of the communication; and
based on the duration of the communication, identify the communication as a generated lead.

10. The system of claim 8, wherein the leads manager is to calculate fees to be charged to the selected provider.

11. A method comprising:
detecting, using at least one processor coupled to a memory, activation of one or more selection visual controls, the one or more selection visual controls associated with a particular service, to permit a user to submit selection criteria with respect to a provider of the particular service, the particular service associated with a plurality of providers in an on-referral service, information about the plurality of providers being maintained by the on-line referral service;
in response to the detecting of the activation of the one or more selection visual controls, determining the selection criteria with respect to a provider of the particular service, the call visual control and the one or more visual controls provided on the same screen of a Graphical User Interface (GUI);
detecting, at the computer system, activation of the call visual control, the activation of the call visual control causing communication of a referral request to the on-line referral service;
in response to the detecting of activation of the call visual control, accessing the selection criteria with respect to a provider of the particular service and selecting a provider of the particular service based on the selection criteria;
determining that the referral request includes the selection criteria with respect to a provider of the particular service;
automatically selecting, from the plurality of providers, a provider of the particular service, in response to the referral request and based on the selection criteria; and
using a call module, implemented using at least one processor, automatically initiating a communication with the selected provider subsequent to the receiving of the referral request and subsequently to the selecting of the provider based on the selection criteria.

12. The method of claim 11, wherein the determining of the metrics includes determining duration of the communication.

13. The method of claim 11, wherein the communication is a voice over Internet protocol (VoIP) call.

14. The method of claim 11, comprising storing information associated with an originator of the referral request and making the information associated with the originator of the referral request available to the selected provider.

15. The method of claim 11, wherein the selecting of the provider from the plurality of providers comprises selecting the provider utilizing business rules.

16. The method of claim 11, wherein the selection criteria is associated with demographic information of a provider from the network of member providers.

17. The method of claim 11, comprising:
determining metrics associated with the communication; and
based on the metrics, identifying the communication as a generated lead.

18. The method of claim 17, comprising calculating fees to be charged to the selected provider.

19. A non-transitory machine-readable storage medium having instruction data to cause a machine to perform operations comprising:
detecting, at a computer system, activation of one or more selection visual controls, the one or more selection visual controls associated with a particular service, to permit a user to submit selection criteria with respect to a provider of the particular service, the particular service associated with a plurality of providers in an on-referral service, information about the plurality of providers being maintained by the on-line referral service;
in response to the detecting of the activation of the one or more selection visual controls, determining the selection criteria with respect to a provider of the particular service, the call visual control and the one or more visual controls provided on the same screen of a Graphical User Interface (GUI);
detecting, at the computer system, activation of the call visual control, the activation of the call visual control causing communication of a referral request to the on-line referral service;
in response to the detecting of activation of the call visual control, accessing the selection criteria with respect to a provider of the particular service and selecting a provider of the particular service based on the selection criteria;
determining that the referral request includes the selection criteria with respect to a provider of the particular service;
automatically selecting, from the plurality of providers, a provider of the particular service, in response to the referral request and based on the selection criteria; and
using a call module, implemented using at least one processor, automatically initiating a communication with the selected provider subsequent to the receiving of the referral request and subsequently to the selecting of the provider based on the selection criteria.

* * * * *